(12) United States Patent
Takeuchi

(10) Patent No.: US 7,986,069 B2
(45) Date of Patent: Jul. 26, 2011

(54) BRUSHLESS ELECTRIC MACHINE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/969,732

(22) Filed: Dec. 16, 2010

(65) Prior Publication Data

US 2011/0084565 A1  Apr. 14, 2011

Related U.S. Application Data

(63) Continuation of application No. 12/236,611, filed on Sep. 24, 2008, now Pat. No. 7,880,356.

(30) Foreign Application Priority Data

Oct. 2, 2007 (JP) ................................ 2007-259063
Jan. 8, 2008 (JP) ................................ 2008-001564

(51) Int. Cl.
  *H02K 35/02* (2006.01)
(52) U.S. Cl. ............... 310/156.43; 310/156.35; 310/266
(58) Field of Classification Search ............ 310/156.43, 310/156.38, 156.12, 156.35, 112–114, 266
See application file for complete search history.

(56) References Cited

U.S. PATENT DOCUMENTS

| | | | | |
|---|---|---|---|---|
| 3,629,626 A | * | 12/1971 | Abbott | 310/49.45 |
| 4,433,260 A | * | 2/1984 | Weisbord et al. | 310/156.03 |
| 4,517,484 A | * | 5/1985 | Dacier | 310/266 |
| 4,908,533 A | | 3/1990 | Karita et al. | |
| 5,349,258 A | * | 9/1994 | Leupold et al. | 310/154.43 |
| 5,808,392 A | | 9/1998 | Sakai et al. | |
| 5,945,766 A | | 8/1999 | Kim et al. | |
| 6,459,185 B1 | * | 10/2002 | Ehrhart et al. | 310/156.45 |
| 6,841,910 B2 | * | 1/2005 | Gery | 310/103 |
| 6,936,937 B2 | * | 8/2005 | Tu et al. | 310/12.12 |
| 7,075,204 B2 | | 7/2006 | Shiao et al. | |
| 7,126,309 B1 | | 10/2006 | Takeuchi et al. | |
| 7,279,812 B2 | | 10/2007 | Barnes | |
| 7,439,640 B2 | | 10/2008 | Takeuchi | |
| 7,501,733 B2 | | 3/2009 | Takeuchi | |
| 7,615,894 B1 | | 11/2009 | Deal | |
| 7,880,356 B2 | * | 2/2011 | Takeuchi | 310/156.43 |
| 7,884,519 B2 | * | 2/2011 | Okuno | 310/156.38 |
| 2007/0234552 A1 | | 10/2007 | Nozawa et al. | |
| 2008/0303356 A1 | | 12/2008 | Aso et al. | |
| 2009/0160383 A1 | | 6/2009 | Takeuchi | |
| 2009/0323208 A1 | * | 12/2009 | Kurosawa | 359/824 |

FOREIGN PATENT DOCUMENTS

| | | |
|---|---|---|
| JP | 04-033551 | 2/1992 |
| JP | 07-298587 | 11/1995 |
| JP | 09-327163 | 12/1997 |
| JP | 2001-023894 | 1/2001 |
| JP | 2001-298982 | 10/2001 |

(Continued)

*Primary Examiner* — Dang D Le
(74) *Attorney, Agent, or Firm* — Harness, Dickey & Pierce, P.L.C.

(57) ABSTRACT

A first member (40*a*) has a magnet assembly (20) that includes a plurality of permanent magnets (10) held with their homopoles contacting one another. A second member (50*a*) includes magnet coils (30), and is designed to be changeable in position relative to the first member. The magnet assembly (20) generates the strongest magnetic field in a magnetic field direction lying in the homopolar contact plane at which the homopoles contact one another, the magnetic field direction being oriented outward from the magnet assembly (20) along the magnetic field direction.

3 Claims, 14 Drawing Sheets

FOREIGN PATENT DOCUMENTS

| | | |
|---|---|---|
| JP | 2005-051857 | 2/2005 |
| JP | 2005-306661 | 11/2005 |
| JP | 2006-115607 | 4/2006 |
| JP | 2007-037241 | 2/2007 |
| JP | 2008-054476 | 3/2008 |
| WO | WO2005-112231 | 11/2005 |
| WO | WO2005-124980 | 12/2005 |
| WO | WO2006-035946 | 4/2006 |

* cited by examiner

Fig.4A
Fig.4B
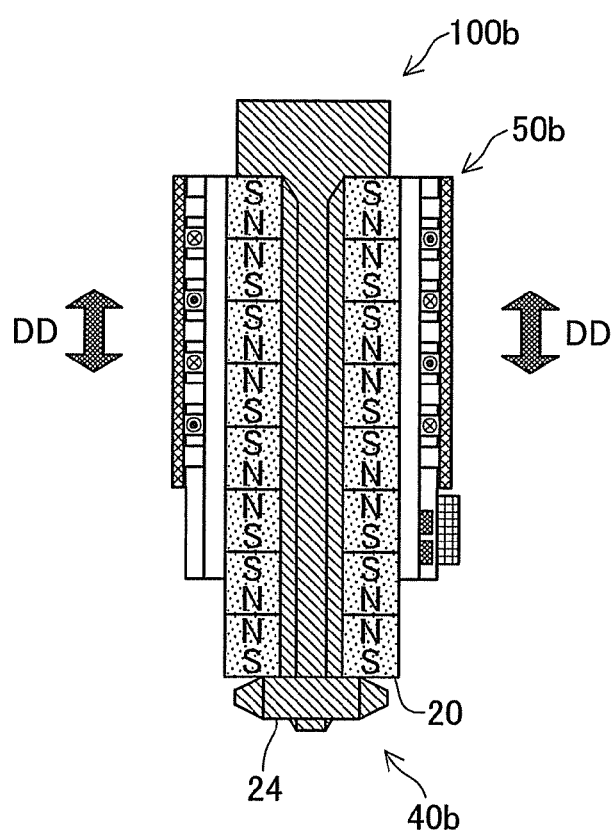
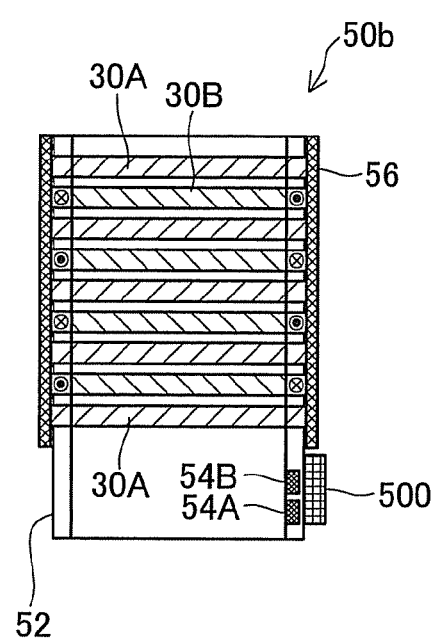

BRUSHLESS ELECTRIC MACHINE

CROSS-REFERENCE TO RELATED APPLICATIONS

This application is a continuation of U.S. patent application Ser. No. 12/236,611 filed on Sep. 24, 2008. The present application claims priority based on Japanese Patent Application No. 2007-259063 filed on Oct. 2, 2007, and Japanese Patent Application No. 2008-001564 filed on Jan. 8, 2008, the disclosures of which are hereby incorporated by reference in their entireties.

BACKGROUND OF THE INVENTION

1. Field of the Invention

The present invention relates to a brushless electric machine that utilizes permanent magnets and magnet coils.

2. Description of the Related Art

The term brushless electric machine is used herein to include both brushless motors and brushless generators. Known brushless motors include that disclosed in JP-A-2001-298982, for example.

However, a problem with the conventional brushless electric machines is that the magnetic flux of the permanent magnets could not always be utilized with good efficiency.

SUMMARY OF THE INVENTION

An object of the present invention is to provide a brushless electric machine that is able to efficiently utilize the magnetic flux of the permanent magnets.

According to an aspect of the present invention, there is provided a brushless electric machine. The brushless electric machine includes a first member having a magnet assembly that includes a plurality of permanent magnets that are held together such that same magnetic poles contacting one another; and a second member including a magnetic coil. The first and second members are changeable in position relative to one another. The magnet assembly generates a strongest magnetic field along a magnetic field direction lying in each homopolar contact plane at which the same magnetic poles contact one another, where the magnetic field direction is oriented outward from the magnet assembly along the magnetic field direction. The magnetic coils are positioned so that current flows in a direction intersecting the magnetic field direction.

This brushless electric machine utilizes the strongest magnetic field along a magnetic field direction that extends outwardly from the magnet assembly at the homopolar contact face of the magnet assembly. Consequently, it is possible to achieve a brushless electric machine that efficiently utilizes the magnetic flux of the permanent magnets.

It is possible for the present invention to be embodied in various other modes, for example, an electric motor, a generator, a method for controlling the same, an actuator or electronic device employing the same, or a fuel cell-powered machine, robot, or moving body.

BRIEF DESCRIPTION OF THE DRAWINGS

FIGS. 4A and 4B are sectional views depicting a configuration of a linear motor according to Embodiment 2.

DESCRIPTION OF THE PREFERRED EMBODIMENT

The preferred modes for carrying out the invention will be described below, in the following order.

A. Magnet Assembly Configuration
B. Various Embodiments
C. Circuit Configuration
D. Modification Examples

A. Magnet Assembly Configuration

Figure 1A:
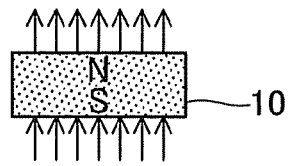
FIGS. 1A-1E illustrate a simplified arrangement of a magnet assembly utilized in the embodiments of the invention.
Figure 1B:
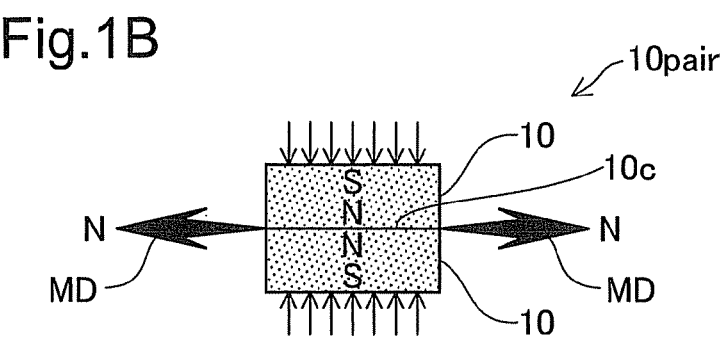
Figure 1C:
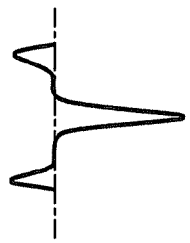

FIG. 1A through 1E depict in simplified form an arrangement of a magnet assembly utilized in the embodiments of the invention. FIG. 1A depicts a single permanent magnet 10. This magnet 10 has been magnetized in the vertical direction. The arrows exiting from the N pole and the arrows entering at the S pole represent lines of magnetic force. FIG. 1B depicts a permanent magnet pair 10pair composed of two magnets 10. In this permanent magnet pair 10pair, the two magnets 10 are held with their N poles contacting one another. When the two magnets 10 are held in this state, the strongest magnetic field will be generated along a magnetic field direction MD directed outward from the homopolar contact plane 10c, as depicted by the heavy arrows. Here, the "homopolar contact plane" refers to a plane defined by the surfaces of the same poles contacting one another. FIG. 1C depicts a distribution of surface magnetic flux density of the permanent magnet pair 10pair. The magnetic field direction MD is a direction lying within the homopolar contact plane 10c and extending outward from the interior (more preferably from the center) of the permanent magnet pair 10pair. Where the magnets 10 are small in size, this magnetic field direction MD will be directed in a radial direction extending outward from the interior (more preferably from the center) of the permanent magnet pair 10pair. Experiments conducted by the inventor have shown that surface magnetic flux density in the magnetic field direction MD of the permanent magnet pair 10pair reaches approximately double the surface magnetic flux density of a single magnet 10 (i.e. magnetic flux density at the upper face in FIG. 1A). Accordingly, in the embodiments of the present invention, motors or generators are designed to utilize the strong magnetic field in the magnetic field direction MD. The permanent magnet pairs 10pair may also be designed to contact each other at their S poles rather than their N poles.

Figure 1D:
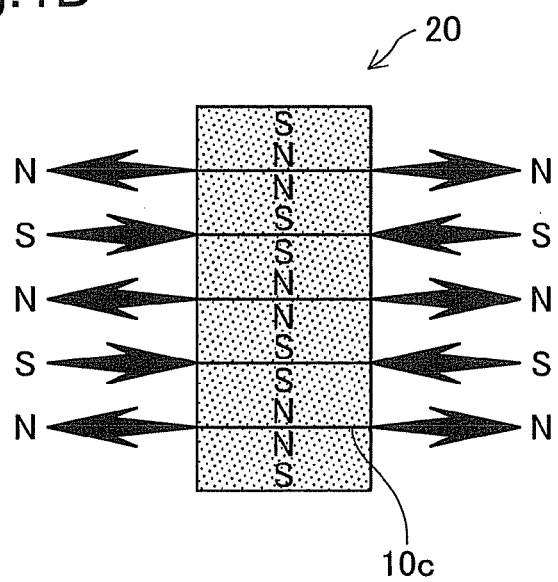
Figure 1E:
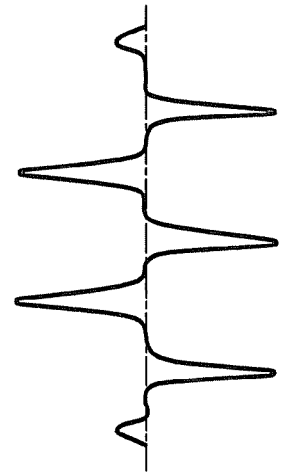

FIG. 1D depicts a magnet assembly 20 that includes six permanent magnets 10 of flat plane shape. Adjacently situated magnets of the magnet assembly 20 are held with their N poles or their S poles in contact with one another. FIG. 1E depicts a distribution of surface magnetic flux density of the magnet assembly 20. As will be understood from the graph, in the area surrounding the magnet assembly 20 (locations to left and right in FIG. 1D), the greatest magnetic flux density is produced at the N pole homopolar contact planes 10c and at the S pole homopolar contact planes 10c, respectively. It will be understood from the above example that it is possible for a magnet assembly including three or more magnets to produce greatest magnetic flux density at its N poles and S poles respectively. In general, it is possible for the magnet assembly 20 to be composed of a plurality of permanent magnets held contacting one another at their homopoles.

B. Various Embodiments

Figure 2A:
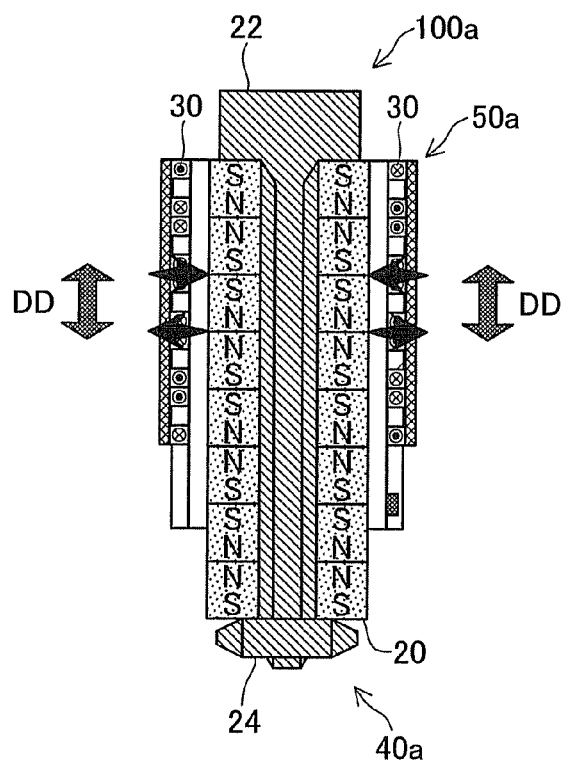
FIGS. 2A-2C are sectional views depicting a configuration of a linear motor according to Embodiment 1.
Figure 2B:
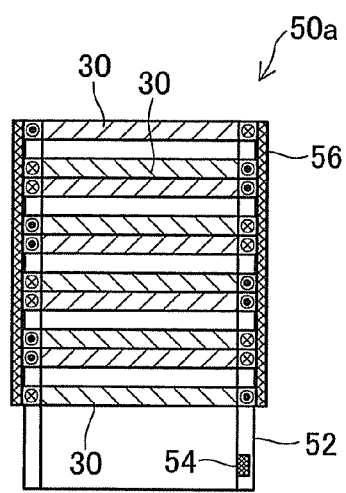

FIG. 2A is a longitudinal sectional view depicting a configuration of a brushless linear motor according to a first embodiment. This linear motor 100a has a first member 40a that includes the magnet assembly 20, and a second member 50a that includes magnet coils 30. In this example, the magnet assembly 20 is a stack of eight flat permanent magnets. FIG. 2B depicts the second member 50a by itself. This second member 50a includes a hollow round cylindrical frame (frame member) 52, a plurality of magnet coils 30 disposed on the frame 52, a magnetic yoke 56 surrounding the perimeter of these magnet coils 30, and a magnetic sensor 54. The magnetic sensor 54 is used as a position sensor for sensing the relative positional relationship of the two members 40a, 50a. The individual magnet coils 30 are respectively wound in the horizontal direction (the left-right direction in the drawing). As depicted in FIG. 2A, the magnet coils 30 are positioned at locations corresponding to the N poles and the S poles of the plurality of the magnets (in this example, five magnets) in the magnet assembly 20. Of two types of markings which have been drawn in the coil cross section, first markings consisting of a black dot inside a circle indicate flow of electrical current from the back side towards the front side in the plane of the page, while second markings consisting of an "x" inside a circle indicate flow of electrical current from the front side towards the back side in the plane of the page. Any two magnet coils 30 with mutually opposite directions of current flow will have a phase difference of $\pi$ from one another. In the field of motors, it is possible to consider with coils phase difference of $\pi$ to have identical phase. According to this definition, this linear motor 100a is a single-phase motor.

Figure 2C:
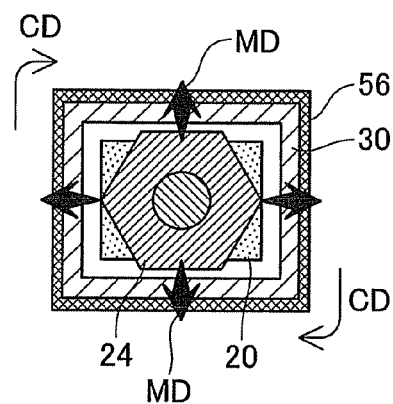

FIG. 2C is a bottom view of the linear motor 100a. The magnetic field direction MD in proximity to the N poles extends radially outward from the interior (or center) of the magnet assembly 20. In FIG. 2C, when electric current flows to the magnet coils 30 along a current direction CD, driving force will act on the magnet coils 30 in a direction from the back towards front in the plane of the page. If the second member 50a that has the magnet coils 30 is fixed, the first member 40a will be driven from the front towards the back in the plane of the page in FIG. 2C. This current direction will be switched at timing coincident with the coils 30 arriving at locations between the N poles and the S poles of the magnet assembly 20. In this way, in the brushless linear motor 100a, it is possible to operate the magnet assembly 20 along the driving direction DD (vertical direction) in FIG. 2A through appropriately timed switching of the current flowing to the magnet coils 30.

In the example of FIG. 2C, the magnet assembly 20 has an oblong shape in horizontal sectional view, but it is possible to employ any number of other shapes, such as circular or triangular, as the shape of the horizontal cross section of the magnet assembly 20. However, it is preferable for the individual permanent magnets 10 that make up the magnet assembly 20 to have plate shape with a small distance between magnetic poles (i.e. thickness), rather than bar shape with a large distance between magnetic poles. The reason is that an electric machine that uses the magnet assembly 20 is designed to utilize the strong magnetic field generated at the homopolar contact planes 10c, so thinner magnets 10 will afford better efficiency. In this sense, it is preferable for the direction of magnetization of the permanent magnets 10 to be aligned with the direction of least thickness.

Figure 3A:
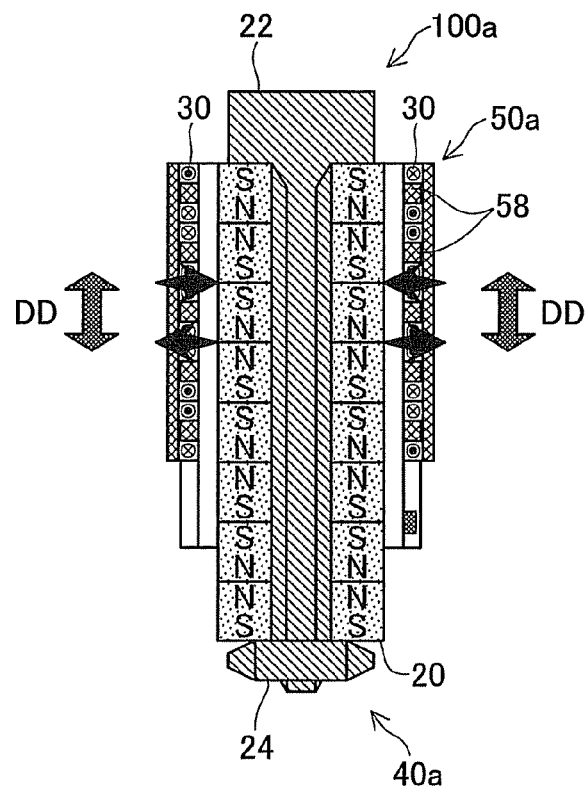
FIGS. 3A-3C illustrate an alternative example of Embodiment 1.
Figure 3B:
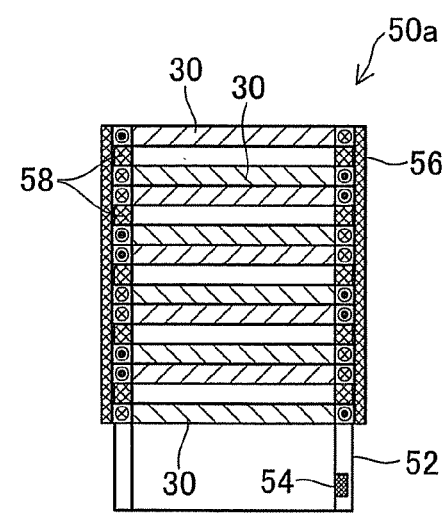
Figure 3C:
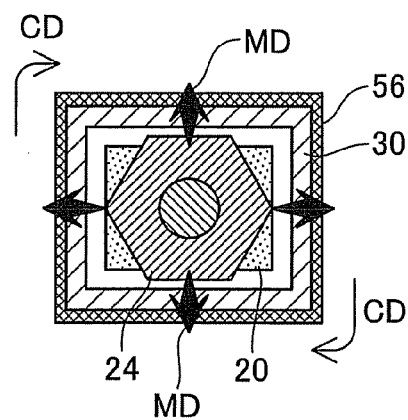

FIG. 3 depicts a modification of the motor of Embodiment 1 depicted in FIG. 2. In this alternative embodiment, a magnetic yoke member 58 is provided as the core of the coil. It is possible to produce greater torque by including the magnetic yoke member 58.

FIG. 4A is a longitudinal sectional view depicting a configuration of a brushless linear motor according to Embodiment 2. This linear motor 100b has a first member 40b that includes the magnet assembly 20, and a second member 50b that includes the magnet coils 30. FIG. 4B depicts the second member 50b by itself. In contrast to the second member 50a depicted in FIG. 2B, this second member 50b includes coils for two different phases, namely phase A coils 30A and phase B coils 30B. For the magnetic sensors as well, two are provided, namely, a phase A sensor 54A and a phase B sensor 54B. Additionally, a drive control circuit 500 is provided on the frame 52. The phase A coils 30A and the phase B coils 30B are positioned in alternating fashion at the same pitch. The pitch of the phase A coils 30A and the phase B coils 30B will be set to equal the pitch of the homopolar contact planes of the magnet assembly 20.

In the condition depicted in FIGS. 4A and 4B, electrical current is flowing to the phase B coils 30B, but no electrical current is flowing to the phase A coils 30A. However, if the relative positions of the two members 40b, 50b should change from the condition depicted in FIG. 4A, electrical current will now flow to the phase A coils 30A at timing coincident with the phase A sensor 54A arriving at a location between the N pole and the S pole of one of the magnets, while electrical current flow to the phase B coils 30B will stop. By carrying out two-phase driving through appropriate switching of current (i.e. application voltage) to the phase A coils 30A and the phase B coils 30B in this way, it is possible for driving to take place along the driving direction DD.

Figure 5A:
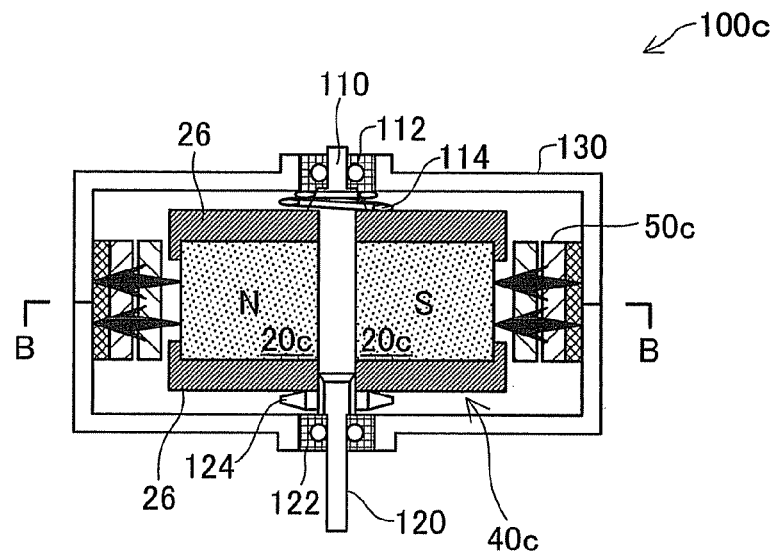
FIGS. 5A and 5B are sectional views depicting a configuration of a brushless rotary motor according to Embodiment 3.
Figure 5B:
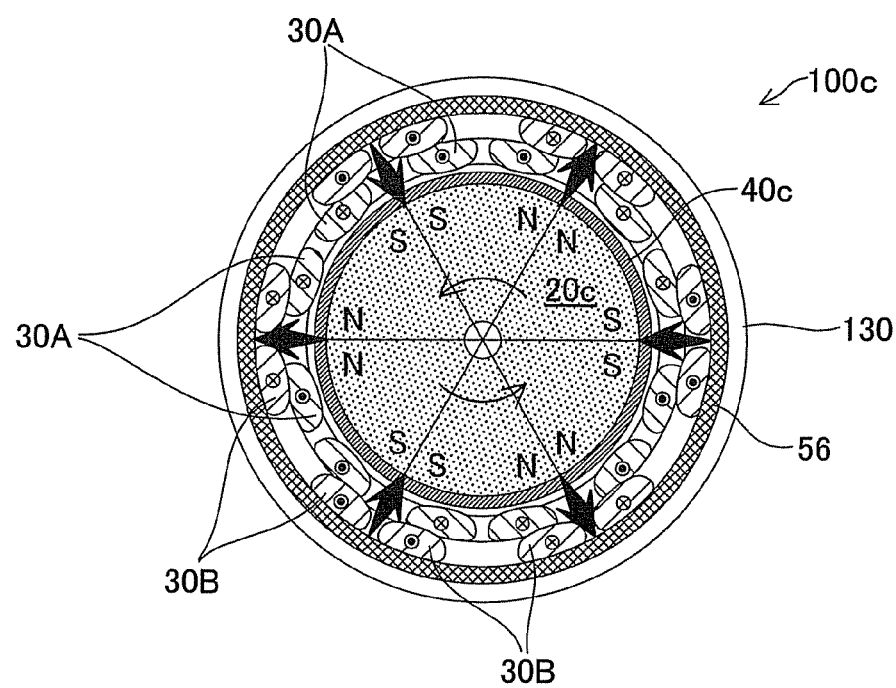

FIG. 5A is a longitudinal sectional view depicting a configuration of a brushless rotary motor according to a third embodiment; and FIG. 5B is a sectional view thereof taken along line B-B. This brushless rotary motor 100c has a rotor (first member) 40c that includes the magnet assembly 20c, and a stator (second member) 50c that includes magnet coils. The magnet coils are affixed about the inner periphery of a casing 130. An upper shaft 110 and a lower shaft 120 of the rotor 40c are held respectively by bearings 112, 122. The magnet assembly 20c is linked at its lower end to the lower shaft 120 by a fastening screw 124. Meanwhile, a spring 114 is disposed about the upper shaft 110 which is linked to the upper end of the magnet assembly 20c, and the magnet assembly 20c is subjected to pressing force at its upper end away from the inside face of the casing 130 by this spring 114. However, the linking structure depicted here is merely exemplary, and it would be possible to employ various other linking structures.

As depicted in FIG. 5B, the magnet assembly 20c of Embodiment 3 has a circular disk shape composed of a plurality of fan-shaped permanent magnets held contacting one another at their homopoles. The magnets held at their upper and lower parts and portions of their outside perimeter by magnetic yokes 26. Accordingly, as indicated by the black arrows, the strongest magnetic fields will be produced in multiple radial directions.

Phase A coils 30A and phase B coils 30B are provided by way of the magnet coils. In the example of FIG. 5B, six phase A coils 30A and six phase B coils 30B are provided, with the phase A coils 30A positioned to further towards outside peripheral side and the phase B coils 30B positioned further towards the inside peripheral side. A magnetic yoke is positioned to the outside of the phase B coils 30. The individual coils depicted in FIG. 5B are wound centered along radial directions that extend outward from the center of the motor. The magnetic sensors have be omitted from the illustration for simplicity. In this motor 100c as well, it is possible to drive the motor in the forward and reverse directions through appropriate switching of the current direction to the phase A coils 30A and the phase B coils 30B.

In Embodiment 3, a six-pole, two-phase motor employing six permanent magnets is shown by way of example, but it would be possible to employ different numbers of poles and numbers of phases. However, in terms of minimizing vibration about the axis, it will be preferable to set the number of poles to $2^n$ where n is a positive integer equal to 2 or greater.

Figure 6A:
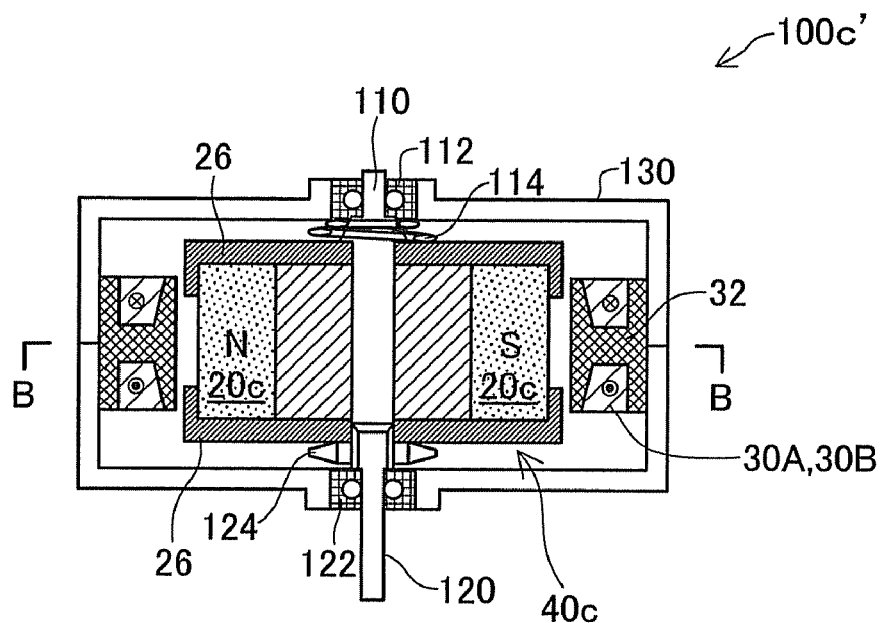
FIGS. 6A and 6B illustrate an alternative example of Embodiment 3.
Figure 6B:
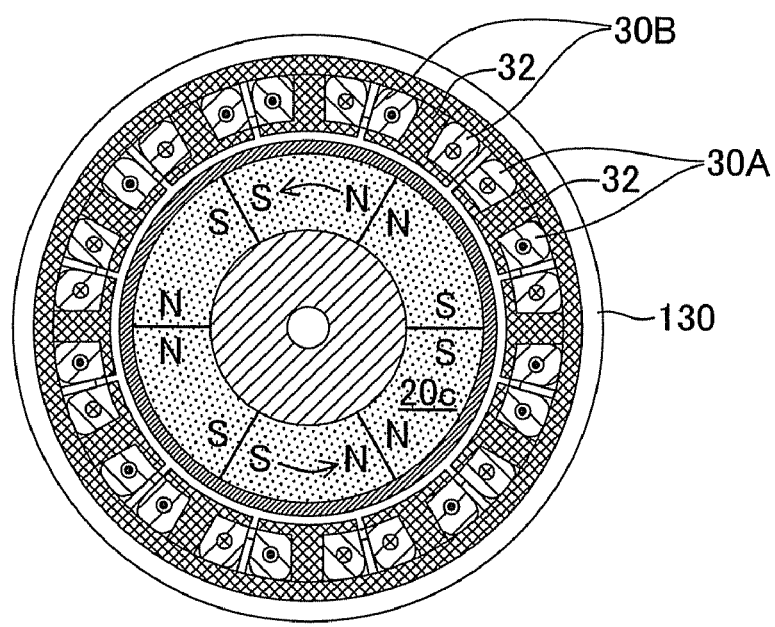

FIG. 6 depicts a modification of the motor of Embodiment 3. In this motor 100c' the plurality of magnets 20c have a donut shaped (ring shaped) design overall. Optionally, a magnetic yoke may be disposed to the inside peripheral side of the plurality of magnets 20. In this motor 100c', the phase A coils 30A and the phase B coils 30B are positioned on the same circle. Additionally, the phase A coils 30A and the phase B coils 30B are each additionally provided with a magnetic yoke member 32 as a core. This modified example affords working effects comparable to Embodiment 3. Also, greater torque is possible due to the additional magnetic yoke members 32.

Figure 7A:
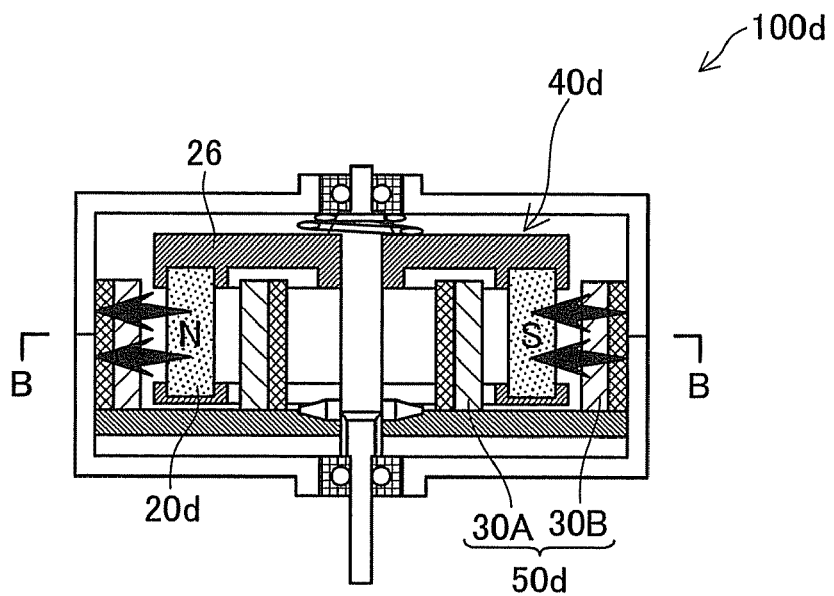
FIGS. 7A and 7B are sectional views depicting a configuration of a brushless rotary motor according to Embodiment 4.
Figure 7B:
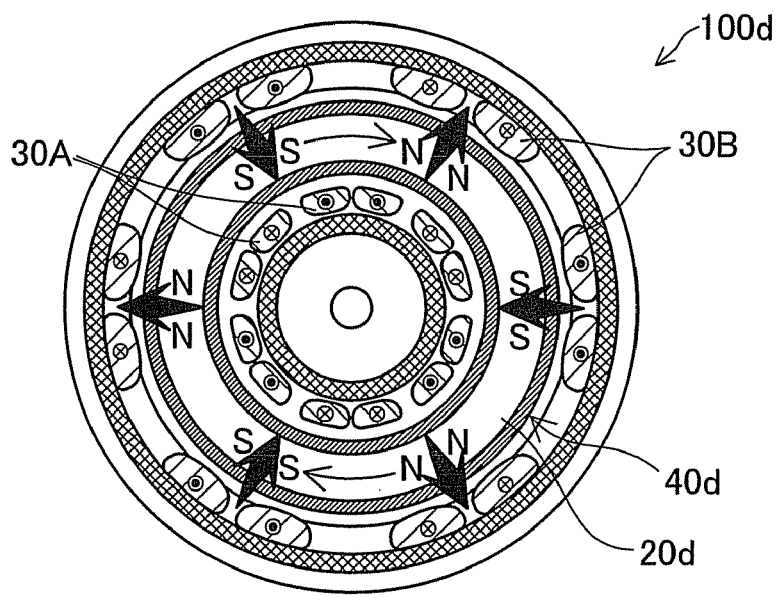

FIG. 7 is a sectional view depicting a configuration of a brushless rotary motor according to a fourth embodiment. This rotary motor 100d differs from Embodiment 3 in that a magnet assembly 20d of ring shape is employed, and the phase A coils 30A are situated peripherally inward from the magnet assembly 20d. The individual magnets that make up the magnet assembly 20d have crescent shape (more precisely, circular arc shape), and the ring-shaped magnet assembly 20d is composed of the plurality of these crescent shaped permanent magnets. With this motor 100d as well, it is possible to drive the rotor 40d in both the forward and reverse directions with respect to the stator 50d. In this embodiment, since magnetic flux density at both the inside and the outside of the ring-shaped magnet assembly 20d can be utilized, it is possible to improve efficiency.

Figure 8A:
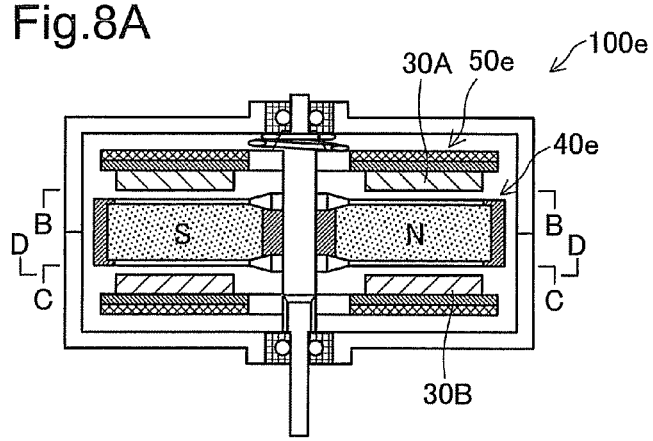
FIGS. 8A-8D are sectional views depicting a configuration of a brushless rotary motor according to Embodiment 5.
Figure 8B:
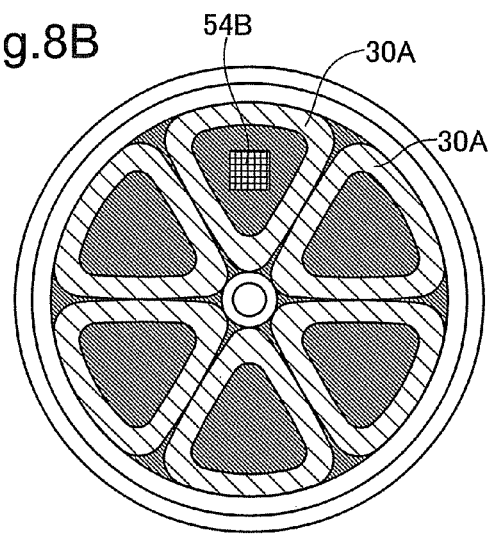
Figure 8C:
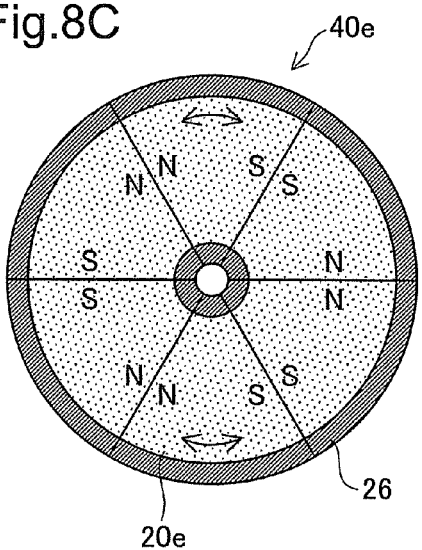
Figure 8D:
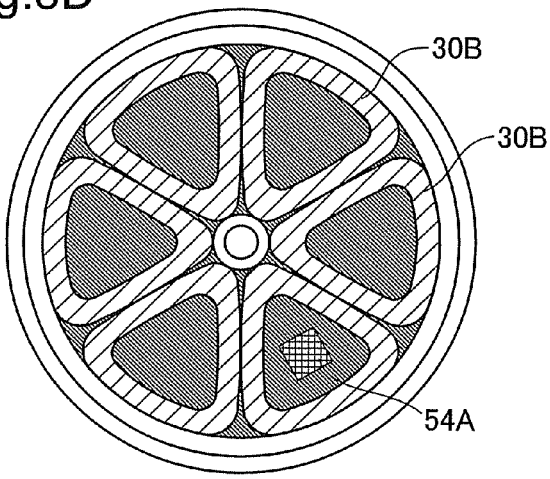

FIG. 8A is a longitudinal sectional view depicting a configuration of a brushless rotary motor according to a fifth embodiment; and FIG. 8B-8D are transverse sectional views thereof. As depicted in FIG. 8C, this brushless rotary motor 100e has a rotor 40e furnished with a magnet assembly 20e of circular disk shape that is composed of a plurality of fan-shaped permanent magnets. The magnet assembly 20e is held at its inside perimeter and outside perimeter by magnetic yokes 26. Consequently, the magnet assembly 20e produces a magnetic field that is strong in a direction orthogonal to the plane of the pace in FIG. 8C (the vertical direction in FIG. 8A). The stator 50e is provided with the phase A coils 30A depicted in FIG. 8B and with the phase B coils depicted in FIG. 8D. As will be appreciated from FIG. 8A, the phase A coils 30A and the phase B coils 30B are disposed to opposite side of the rotor 40e (i.e. above and below it). Since the magnetic field of the magnet assembly 20e is primarily directed along the vertical direction in FIG. 8A, using these coils 30A, 30B it will be possible to effectively utilize a strong magnetic field (magnetic flux density).

Figure 9A:
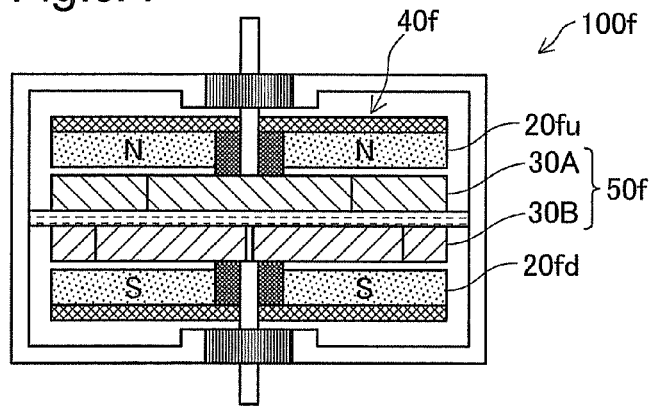
FIGS. 9A-9E are sectional views depicting a configuration of a brushless rotary motor according to Embodiment 6.
Figure 9B:
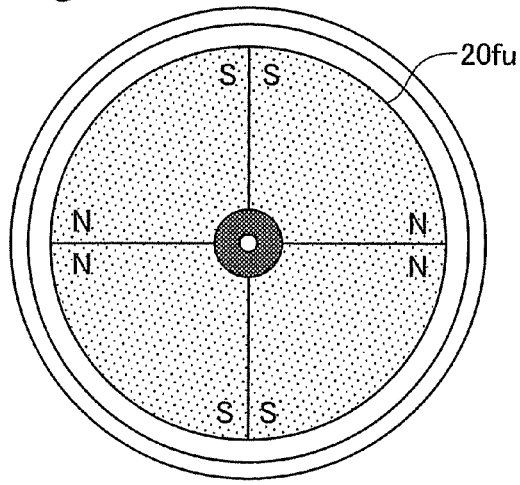
Figure 9C:
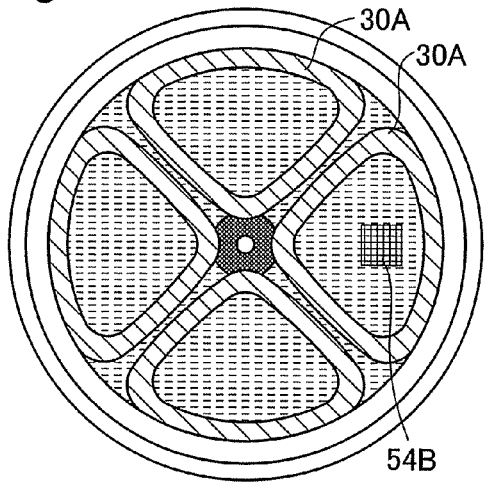
Figure 9D:
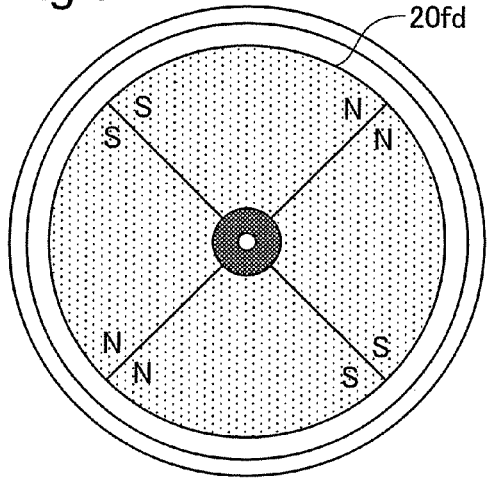
Figure 9E:
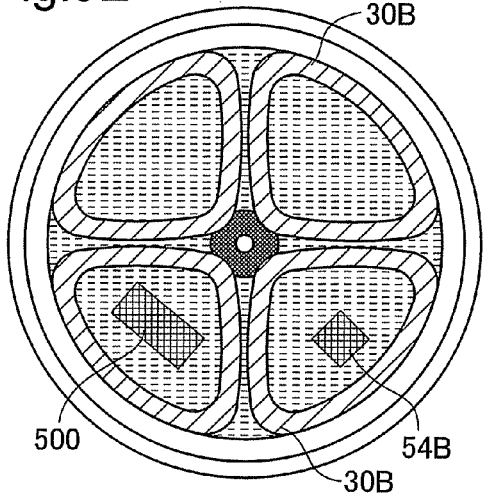

FIG. 9A is a longitudinal sectional view depicting a configuration of a brushless rotary motor according to a sixth embodiment; and FIG. 9B-9D are transverse sectional views thereof. The rotor 40f of this rotary motor 100f has an upper magnet assembly 20fu and a lower magnet assembly 20fd. As depicted in FIGS. 9B and 9D, the magnet assemblies 20fu, 20fd respectively have circular disk shape composed of a plurality of fan-shaped permanent magnets. The individual magnets of the magnet assemblies 20fu, 20fd are shifted with respect to one another by the equivalent of one-half the pitch of the magnetic poles. The stator 50f has phase A coils 30A and phase B coils 30B that respectively face the magnet assemblies 20fu and 20fd. As depicted in FIGS. 9C and 9E, these coils 30A, 30B are also shifted with respect to one another by the equivalent of one-half the pitch of the magnetic poles. With the motor of Embodiment 6, as with the motor of Embodiment 5, it will be possible to effectively utilize strong magnetic fields produced in the vertical direction by the magnet assemblies 20fu, 20fd.

As will be appreciated from the embodiments described above, it is possible for the brushless electric machines according to the modes of the invention set forth herein to be reduced to practice as any of various types of brushless electric machine of a design having a first member with a magnet assembly that includes a plurality of permanent magnets, and having a second member that includes magnetic coils, and in which the first and second members are capable of motion relative to one another.

C. Circuit Configuration

Figure 10:
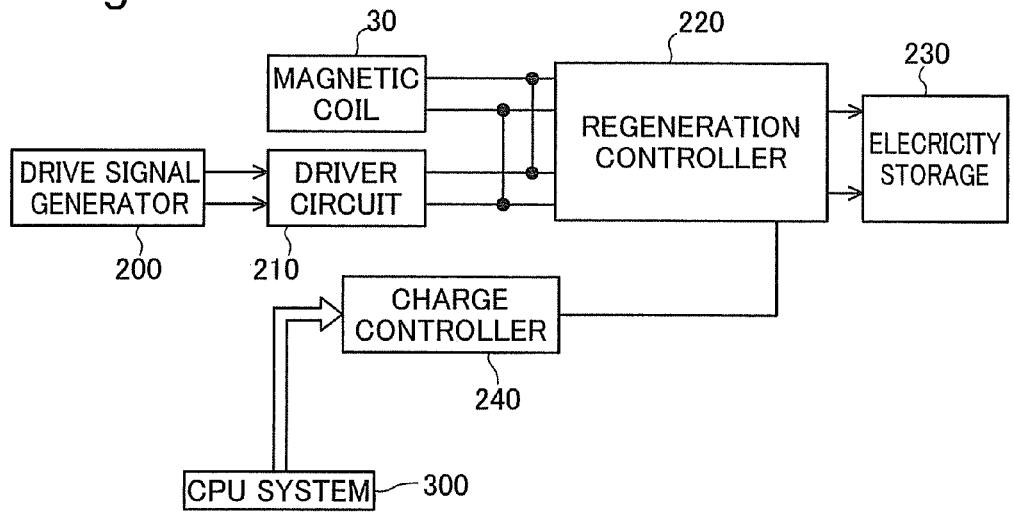
FIG. 10 is a block diagram depicting a configuration of a control circuit of a brushless electric machine.

FIG. 10 is a block diagram depicting a configuration of a control circuit of a brushless electric machine in an embodiment. This control circuit includes a CPU system 300; a drive signal generator 200; a driver circuit 210; a regeneration controller 220; a electricity storage 230; and a charge controller 240. The drive signal generator 200 generates a drive signal for presentation to the driver circuit 210.

Figure 11:
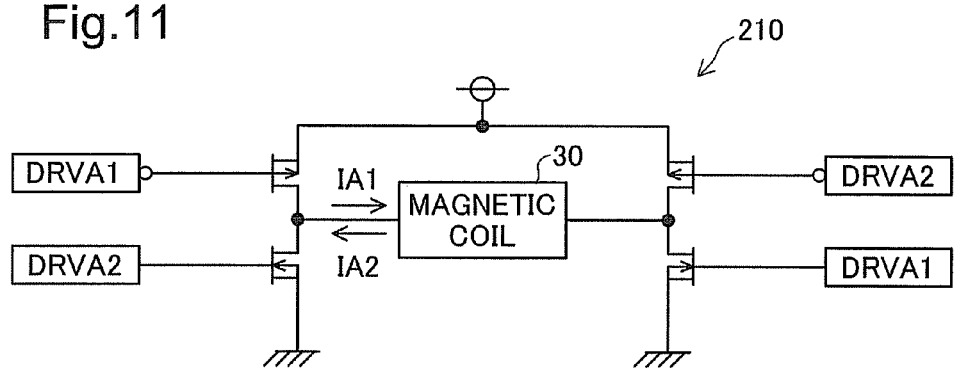
FIG. 11 is a circuit diagram depicting a configuration of a driver portion.

FIG. 11 is a circuit diagram depicting a configuration of the driver circuit 210. This driver circuit 210 is configured as an H-bridge circuit. The driver circuit 210 is supplied with a first drive signal DRVA1 or a second drive signal DRVA2 by the drive signal generator 200. The electrical currents IA1, IA2 shown in FIG. 10 indicate the direction of current (also termed the "driving current") flowing in response to these drive signals DRVA1, DRVA2. Switching of the electrical currents IA1, IA2 takes place appropriately according to the output signal of the magnetic sensor 54.

Figure 12:
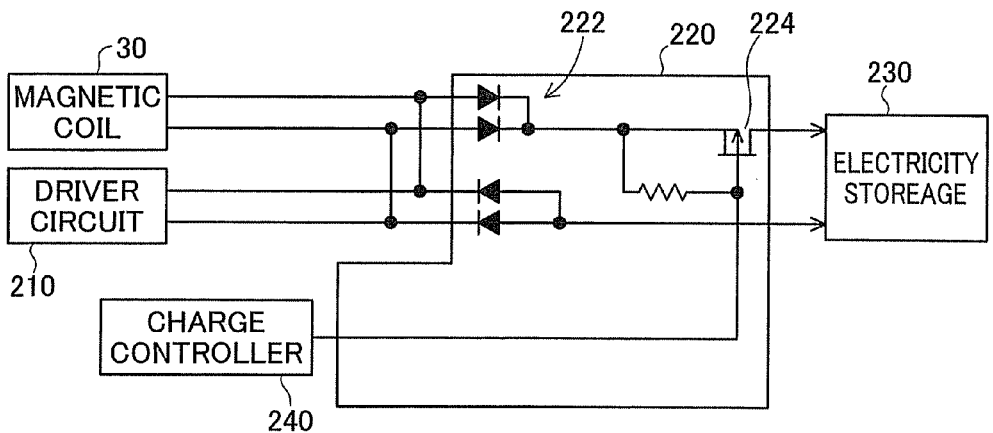
FIG. 12 is a circuit diagram depicting an internal configuration of a regeneration controller.

FIG. 12 is a circuit diagram depicting an internal configuration of the regeneration controller 220. The regeneration controller 220 is connected to the magnetic coils 30 in parallel with the driver circuit 210. The regeneration controller 220 includes a rectifier circuit 222 composed of diodes; and a switching transistor 224. When the switching transistor 224 is switched to the On state by the charge controller 240, it will be possible to use the power generated by the electromagnetic coils 30 to charge the electricity storage 230. It will also possible to supply the electromagnetic coils 30 with current from the electricity storage 230. The regeneration controller 220, the electricity storage 230, and the charge controller 240 are not essential to the control portion and may be dispensed with; or the drive signal generator 200 and the driver circuit 210 may be dispensed with. While FIGS. 10 to 12 illustrate a controller circuit for a single-phase motor, it would be possible to easily design a controller circuit for any number of phases equal to two or more.

In the brushless motors of the embodiments described hereinabove, a strong magnetic field is generated by a magnet assembly designed with the homopoles held contacting one another, and drive power is generated through interaction of this magnetic field with the magnet coils, whereby it is possible for the motor to generate power efficiently through flow of current in to the magnet coils. Moreover, where the brushless electric machine is designed as a brushless generator, it will be possible to generate power efficiently. Additionally, because the magnetic fields are formed by the homopoles of the permanent magnets, the gaps between homopoles can be made extremely small, enabling a very large number of homopoles to be provided and thus making it possible to achieve an efficient electrical motor of high torque type even at low speed. Furthermore, whereas the preceding embodiments employed a motor design lacking a magnetic yoke, it would be possible for the invention to be embodied in a brushless motor equipped with a magnetic yoke as well.

D. Modification Examples

The modes and embodiments set forth herein should not be construed as imposing any particular limitation of the present invention, and it is to be understood that the present invention may be embodied with various changes such as the following without departing from the spirit and scope of the invention.

D1. Modification Example 1

In the embodiments above, the mechanical designs and circuit designs of brushless electric machines are described by way of specific examples, but it is possible to employ any of various other configurations as the mechanical and circuit designs in brushless electric machines according to the invention.

D2. Modification Example 2

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive. Motors in accordance with the present invention may be also employed in a moving body and a robot.

Figure 13:
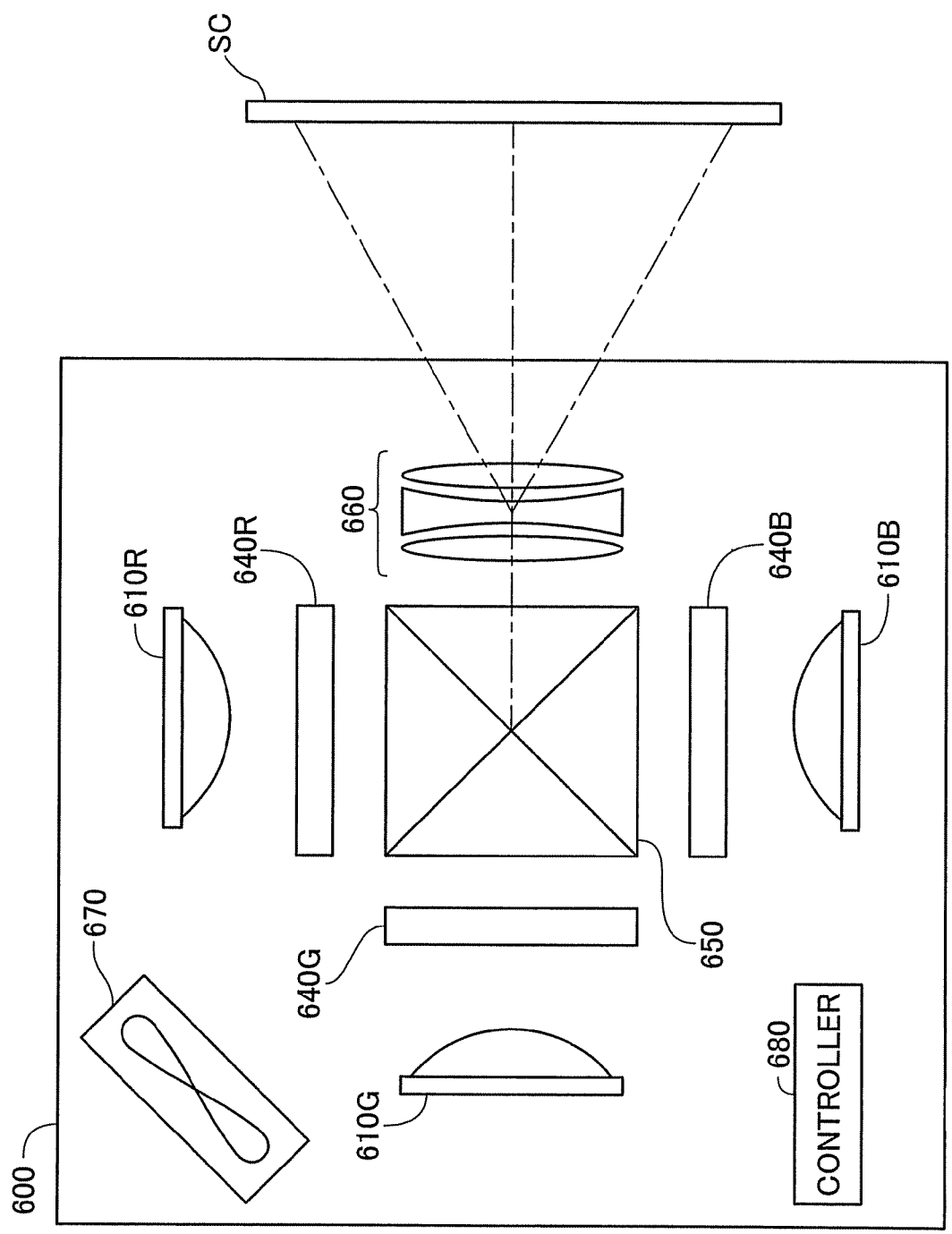
FIG. 13 illustrates a projector utilizing a motor according to a mode of the present invention.

FIG. 13 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 14A:
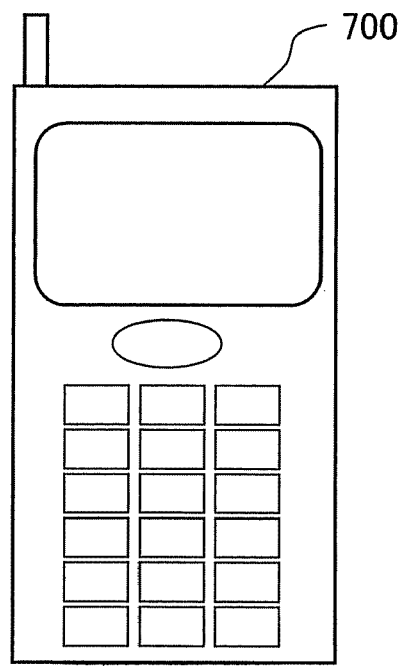
FIGS. 14A-14C illustrate a mobile phone of fuel cell type utilizing a motor according to a mode of the present invention.
Figure 14B:
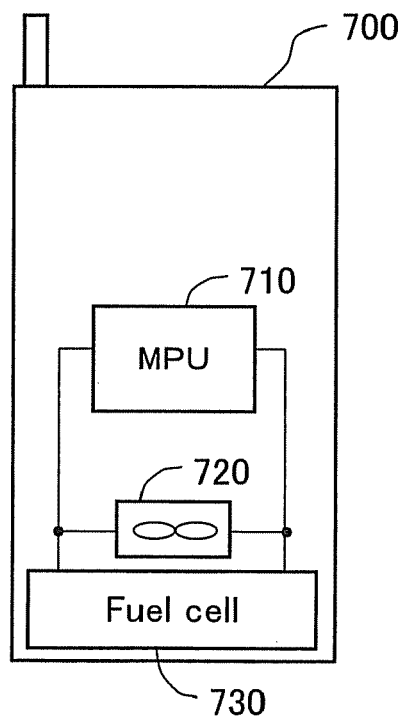
Figure 14C:
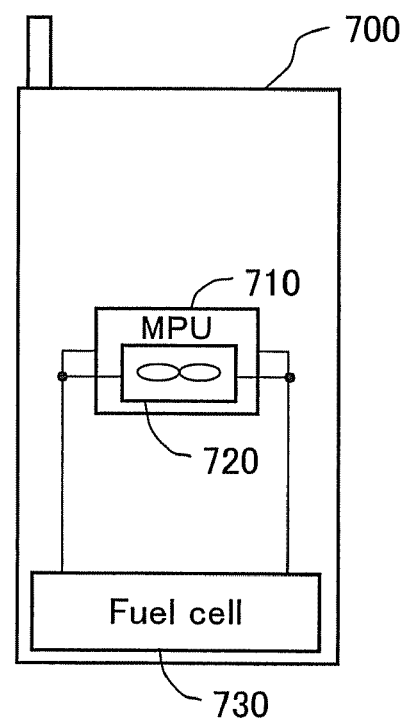

FIGS. 14A-14C illustrate a mobile phone utilizing a motor according to the present invention. FIG. 14A shows the external view of a mobile phone 700, and FIG. 14B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 14C, to cool the MPU 710. Various rotation type brushless motors described above can be used as the motor for driving the fan 720.

Figure 15:
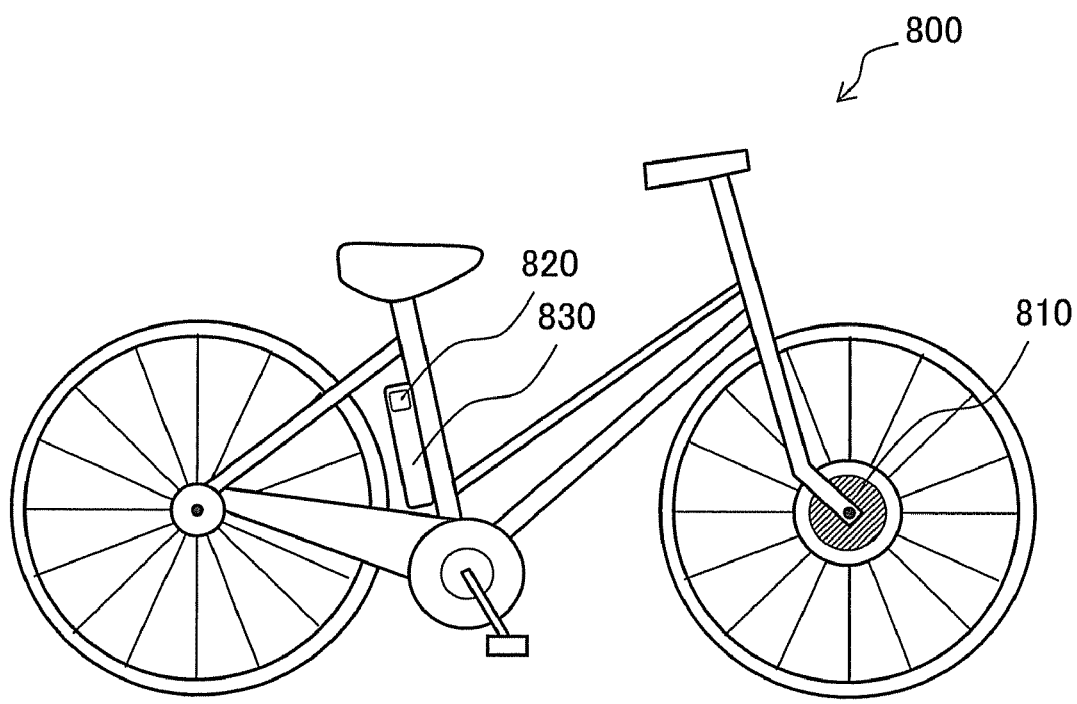
FIG. 15 illustrates an electric bicycle (power-assisted bicycle) as an example of a moving vehicle utilizing a motor/generator according to a mode of the present invention.

FIG. 15 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 16:
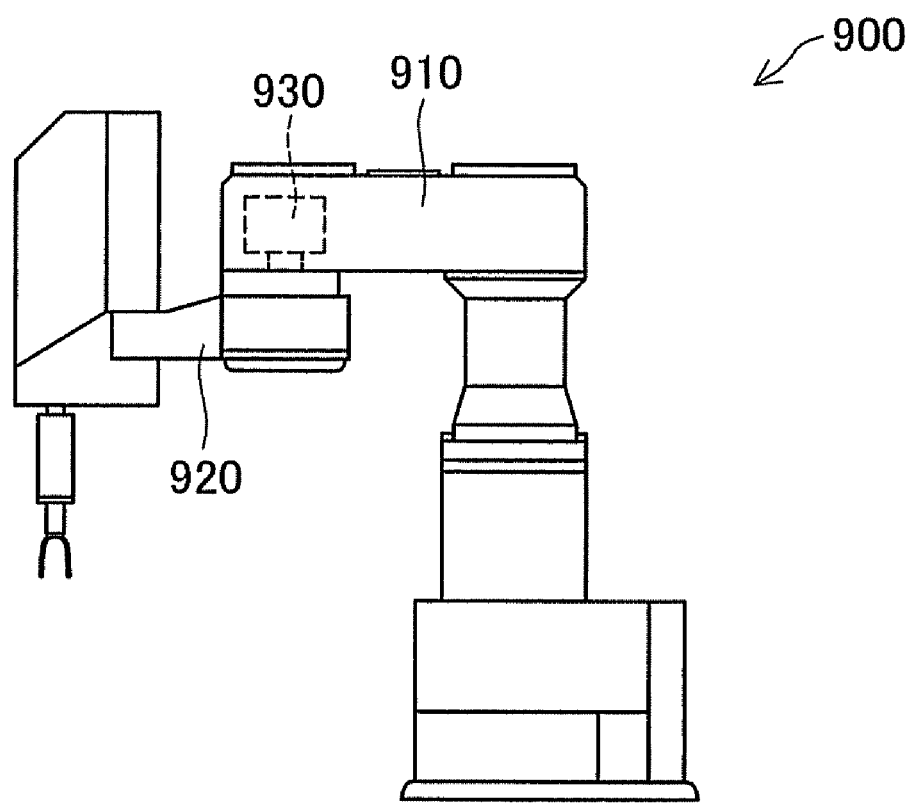
FIG. 16 illustrates an example of a robot utilizing a motor according to a mode of the present invention.

FIG. 16 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A brushless rotary motor comprising:
   a rotor having a rotor axis and a magnet assembly that includes a plurality of permanent magnets that are held together such that same magnetic poles contact one another; and
   a stator including magnetic coils encircling the rotor, the rotor and the stator being changeable in position relative to one another;
   wherein each of the plurality of permanent magnets is a crescent-shaped magnet that is magnetized in a circular direction on a plane vertical to the rotor axis,
   the magnet assembly is held at its upper and lower parts and outside perimeter by magnetic yokes such that the plurality of crescent-shaped magnets make a ring shape while the same magnetic poles contact one another,
   the magnet assembly generates a strongest magnetic field along a magnetic field direction lying in multiple radial directions along each homopolar contact plane at which the same magnetic poles contact one another, the magnetic coils are positioned so that current flows in a direction intersecting the magnetic field direction, and the magnetic coils include a plurality of A phase coils and a plurality of B phase coils, a selected one of the A and B phase coils is located inside the ring shaped magnetic assembly, and the other of the A and B phase coils is located outside the ring shaped magnetic assembly.

2. A robot comprising the brushless rotary motor according to claim 1.

3. A moving body comprising the brushless rotary motor according to claim 1.

* * * * *